United States Patent [19]

Krauser

[11] 4,454,970
[45] Jun. 19, 1984

[54] SUPPORTING ARRANGEMENT

[75] Inventor: Michael Krauser, Germering, Fed. Rep. of Germany

[73] Assignee: Krauser KFZ-Zubehör-Vertriebs GmbH, Mering, Fed. Rep. of Germany

[21] Appl. No.: 294,177

[22] Filed: Aug. 19, 1981

[30] Foreign Application Priority Data

Aug. 27, 1980 [DE] Fed. Rep. of Germany ....... 3032312

[51] Int. Cl.³ .............................................. B62J 11/00
[52] U.S. Cl. .................................. 224/39; 248/295.1; 248/311.2; 280/202
[58] Field of Search ..................... 224/39, 32 R, 32 A; 248/295.1, 223.4, 224.4, 225.1, 311.2; 280/202, 289 A

[56] References Cited

U.S. PATENT DOCUMENTS

| 1,631,355 | 6/1927 | Baldwin | 248/295.1 X |
| 2,890,819 | 6/1959 | Glenny | 280/202 X |
| 4,081,117 | 3/1978 | Crane | 224/39 |
| 4,094,416 | 6/1978 | Smith | 248/311.2 X |

FOREIGN PATENT DOCUMENTS 46539  3/1982  Fed. Rep. of Germany ........ 224/39

Primary Examiner—Steven M. Pollard
Attorney, Agent, or Firm—Michael J. Striker

[57] ABSTRACT

A supporting arrangement for mounting, for example baggage pouches on a motor cycle, includes two L-shaped brackets each having a longitudinal leg and a transverse leg. The longitudinal legs each is formed with two parallel portions offset relative to one another and provided, respectively with openings or projections. In assembly the projections of one portion of one bracket engage the openings of another portion of the second bracket so that the exposed sides of the longitudinal legs of both brackets extend in the same plane.

11 Claims, 4 Drawing Figures

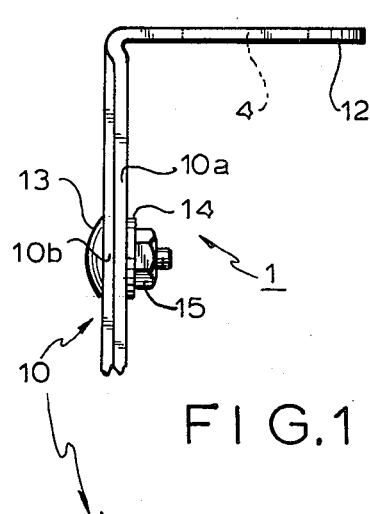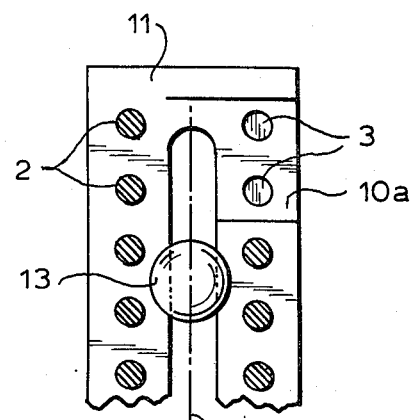
FIG.1
FIG.2
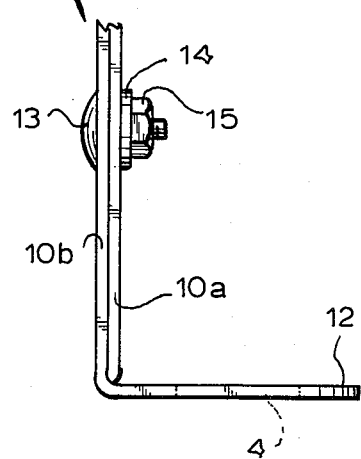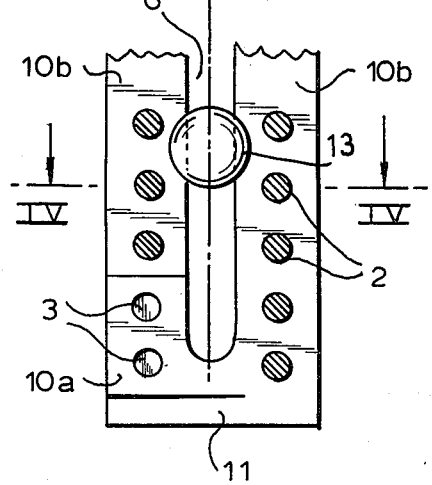
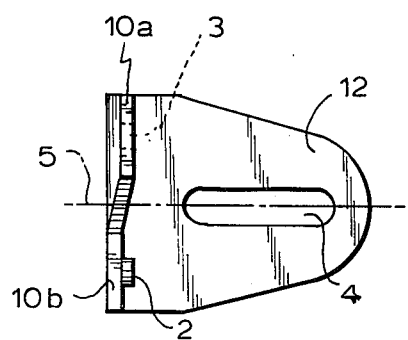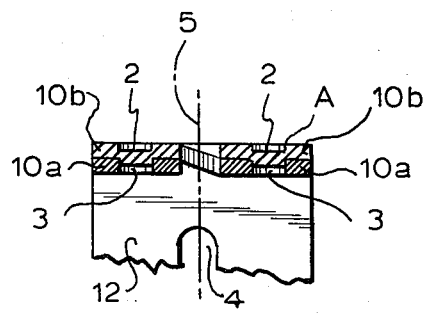
FIG.3
FIG.4

SUPPORTING ARRANGEMENT

BACKGROUND OF THE INVENTION

The present invention relates to arrangements for mounting various elements in assemblies to each other. More particularly, the invention relates to a mounting support adapted to mount laterally positioned trunks or baggage bags on a motor cycle.

Conventional supporting elements of the type under consideration include a substantially flat elongated portion reinforced with a number of beads extended in the direction of elongation of the portion and two transverse portions each projecting normally to the elongated portion and provided with an oblong opening for fastening the element to the support carrying a baggage bag. Such supports are connected to each other and secured to the motor cycle. One the known arrangements is disclosed, for example in German Gebrauchmuster application DE-GM No. 77 07 615. Two supporting elements in the known device are fastened to both opposite baggage supports by means of bolts and nuts. The baggage support disclosed in the above application may be, for example a cross-bracing which connects two baggage pouches to each other and positioned at the rear end of the motor cycle as viewed in a direction of driving.

Inasmuch as the distance between the baggage supports on a motor cycle varies in dependence upon the type of the motor cycle the baggage supports of differing length are required and are manufactured. For example, the distance between the baggage supports may vary in the range of 20 cm to 35 cm. Since the baggage supports, for example of the type disclosed in the aforementioned German document are relatively rigid and stable their dimensions also can be adjusted correspondingly. If the length of the baggage supports varies about 1 cm from one another in the distance range of 20-35 cm, 16 different variants of the supports can be produced. Nine variants of the supports may be produced if the difference in their length is about 2 cm.

In order to facilitate manufacturing and storage of supporting elements an L-shaped bracket has been proposed. In such bracket a longer leg is provided with a slot and both legs are formed with reinforcing beads extended in a direction of elongation of the respective leg. A shorter leg extended perpendicularly to the longer one is provided with an oblong opening. Two L-shaped brackets are connected to each other by bolts extended through the slots of adjacent longer legs and rigidly tightened by nuts. So assembled one-unit supporting bracket should neutralize the lateral swinging occurring particularly during the driving when the bracket is fastened to the baggage supports of the motor cycle.

Since the baggage box allows for maximum weight of 15 kg the relatively great forces act on the brackets in the direction of their longer legs, which forces are practically unavoidable; in course of time these loads can cause loosening of the bolts connecting the brackets to each other, and lateral swinging of the baggage boxes carrying a baggage can not be prevented. Since loosening of both L-shaped brackets in the assembly has been found unavoidable, such supporting arrangements although easy in manufacturing have not been widely employed in practice.

SUMMARY OF THE INVENTION

It is therefore an object of the present invention to avoid the disadvantages of the prior art.

Another object of the invention is to provide an improved support arrangement.

Still another object of the present invention is to provide a support arrangement which is rigid and reliable in operation.

Still a further object of the invention is to provide a supporting element which solely maintains two opposite baggage supports on a motor cycle.

These and other objects of the invention are attained by a supporting arrangement, particularly for connecting support elements for mounting bags on a motorcycle, comprising two brackets connected to each other by connecting means, each of said brackets having an L-shape and including a longitudinal leg and a transverse leg, said longitudinal leg having an elongated slot to receive said connecting means and including a first elongated portion and a second elongated portion, said first and second portions being offset relative to each other and extending in the planes parallel to one another, said first portion having openings and said second portion having projections, the longitudinal leg of one of said two brackets cooperating with the longitudinal leg of another bracket so that the projections of said second portion of said one bracket engage with the openings of said first portion of said another bracket and the projections of said second portion of said another bracket engage with the openings of said first portion of said one bracket.

The transverse legs of the two brackets are spaced from each other at a predetermined distance. Each of the transverse legs may be provided with an oblong opening.

The connecting means may include at least two bolts and two tightening nuts, said bolts extending into the respective slots of said longitudinal legs to connect the brackets to one another so as to prevent the latter from a relative displacement.

The openings in the first portion may extend along a common axis in a direction of elongation of said first portion and are equally spaced from each other, said projections in the second portion extending along a common axis in a direction of elongation of the second portion and being equally spaced from each other a distance corresponding to that of said openings.

The length of the longitudinal leg may substantially correspond to a distance between the support elements for mounting bags on a motor cycle.

The first portion and the second portion of the longitudinal leg of each bracket may be interconnected with a cross-bar so that said first and second portions are offset a predetermined distance.

Said first portions may have an upper side and an underside and said second portion may have an upper side and an underside, the underside of said second portion extending in a plane of the upper side of said first portion, said projections extending outwardly from said underside of said second portion whereby in assembly the upper side of the second portion of one bracket lies in the same plane as the upper side of the second portion of another bracket. The distance between the neighboring openings may be about 1 cm and the distance between the neighboring projections is about 1 cm.

The brackets may be made out of NIROSTA material, (trademark) as stainless steel.

The distance between the transverse legs may be adjustable.

In contradistinction with the above described conventional L-shaped brackets, in the arrangement according to the present invention the bolts connecting two brackets to each other do not loosen in operation because the forces acting on the arrangement are taken by and distributed between the openings and corresponding projections formed on the longitudinal legs of the brackets.

Due to offset position of two portions of each bracket the outer sides as well as the inner sides of the longitudinal legs of both brackets in assembly are flush with each other and therefore the surfaces of the longitudinal legs of both brackets extend in the same plane in the region where the corresponding portions of the legs overlap each other. The exposed surface of the arrangement is therefore so flat that even a number plate of a motor cycle can be mounted thereon.

The provision of a plurality of openings and corresponding projections extending respectively along common axes makes it possible to provide various modifications of the arrangement of different width.

The supporting arrangement according to the invention is a unitary, stable and very rigid structure which is very easy in assembling and reliable in operation. Only two simple steps are required in manufacturing of an individual bracket, namely stamping of an elongated element and bending of the same to obtain an L-shaped configuration. The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWINGS

FIG. 1 is a side view, with a portion removed, of a supporting element according to the invention.

FIG. 2 is a lower view of the supporting element of FIG. 1;

FIG. 3 is a top plan view of an individual bracket; and

FIG. 4 is a sectional view on line IV—IV of FIG. 2.

DETAILED DESCRIPTION OF THE PREFERRED EMBODIMENTS

Referring first to FIGS. 1 and 2 which illustrate a supporting element according to the invention it can be seen that the assembly includes two connecting brackets 1 inserted into one another in a manner which will be explained in detail below.

Each bracket 1 has a first longitudinal leg or shank 10 and a second shorter leg 12 which is bent 90° to the first leg 10. Both legs are interconnected by a relatively narrow cross-bar 11. The brackets 1 may be made out of Nirosta-material (trademark) as stainless steel.

The shorter legs 12 spaced from one another in the assembly serve as fastening plates, for example for baggage pouches of a motor-cycle.

The longer leg 10 of each bracket includes two portions 10a and 10b extended parallel to each other and spaced from one another. The portions 10a and 10b are connected to each other by means of the above-mentioned cross-bar 11.

The portion 10a of each bracket 1 is formed with a plurality of openings 3 which are equally spaced from each other in a longitudinal direction and extend through a common axis. The portion 10b of each bracket is in turn provided with a plurality of naps or projections 2 which also extend through a common axis and are spaced from each other in a longitudinal direction an equal distance.

Referring now to FIG. 3, it may be seen that portions 10a and 10b are offset relative to one another in a direction of an axis 5. It is to be understood that the underside of portion 10b from which the projections 2 are extended lies in the same plane as the upper side of portion 10b in which openings 3 are formed.

When the supporting element in accordance with the invention is to be applied to a required place, for example to the baggage supports of the motor-cycle, two brackets 1 are placed one into another so that the openings 3 of the leg portion 10a of one bracket engage with the projections 2 of the leg portion 10b of the other bracket. Such assembling is clearly shown in FIG. 4.

Due to the offset position of portions 10a and 10b to each other the upper sides of the respective portions of two individual brackets in assembly lie in the same plane A.

When two brackets 1 are inserted one into another in the manner described above the shorter legs 12 which are positioned at a predetermined distance from one another serve as fastening plates for securing the assembly to a certain attachment, such as supports of baggage pouches. Each leg 12 is provided with an oblong aperture 4 into which a bolt (not shown) is to be inserted.

As seen in FIG. 3 a slot 6 is formed at each longitudinal leg 10 between portions 10a and 10b. At least two bolts 13 having a flat head are inserted into slot 6. The bolts 13 each has a squared portion on the underside of its head having a width corresponding to the width of the slot. The bolts 13 after insertion into the slot 6 are tightened at the opposite sides of the brackets by means of circlips 14 and nuts 15 so that the brackets 1 are rigidly connected to each other in the abovedescribed assembled position. The rigid supporting element is then applied to the suitable support, such as the support of the baggage pouch of the motor-cycle and fastened thereto by means of screws extended through the apertures 4 and respective tightening nuts (not shown).

Inasmush as all acting forces exerted in the motorcycle frame are transmitted to the supporting element 1 in a direction of both portions 10a and 10b these forces will be taken by projections 2 extending into openings 3 and the displacement of two brackets rigidly connected to each other by the bolts will be prevented. The forces acting in the direction of elongation of legs 10a and 10b will not therefore affect the tightly fastened bolts which potentially can become slackened by said forces.

When the assembled support element 1 is rigidly connected to a respective support on the motor-cycle they constitute a single one-piece rigid support.

If in the support element the longer leg of each bracket is of approximately 20 cm the projections 2 as well as the openings 2 may be made at a distance of about 1 cm from each other; when all projections 2 are inserted into the respective openings 3 the distance between the legs 12 of the respective brackets in assembly may be 21 cm, whereas when only, for example five projections 2 are engaged with respective openings 3 the distance between legs 12 may be 34 cm. This means that the length of the supporting element may be adjustable even in the case that the length of the longitudinal leg is 19 cm; such length may vary in the range from 21 cm to 34 cm and in each case a rigid and reliable support element may be obtained.

It will be understood that each of the elements described above, or two or more together, may also find a useful application in other types of supporting arrangements differing from the types described above.

While the invention has been illustrated and described as embodied in a supporting arrangement, it is not intended to be limited to the details shown, since various modifications and structural changes may be made without departing in any way from the spirit of the present invention.

Without further analysis, the foregoing will so fully reveal the gist of the present invention that others an, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A supporting arrangement particularly for connecting support elements for mounting bags on a motorcycle, comprising two brackets connected to each other by connecting means, each of said brackets having an L-shape and including a longitudinal leg and a transverse leg, said longitudinal leg having an elongated slot to receive said connecting means and including a first elongated portion and a second elongated portion, said first and second portions being offset relative to each other and extending in the planes parallel to one another, said first portion having openings and said second portion having projections, the longitudinal leg of one of said two brackets cooperating with the longitudinal leg of another bracket so that the projections of said second portion of said one bracket engage with the openings of said first portion of said another bracket and the projections of said second portion of said another bracket engage with the openings of said first portion of said one bracket.

2. The arrangement of claim 1, wherein said transverse legs of said two brackets are spaced from each other at a predetermined distance.

3. The arrangement of claim 2, wherein each of said transverse legs is provided with an oblong opening.

4. The arrangement of claim 3, wherein said connecting means include at least two bolts and two tightening nuts, said bolts extending into the respective slots of said longitudinal legs to connect said brackets to one another so as to prevent the latter from a relative displacement.

5. The arrangement of claim 4, wherein said openings in said first portion extend along a common axis in a direction of elongation of said first portion and are equally spaced from each other, said projections in said second portion extending along a common axis in a direction of elongation of said second portion and being equally spaced from each other a distance corresponding to that of said openings.

6. The arrangement of claim 5, wherein the length of said longitudinal leg substantially corresponds to a distance between the support elements for mounting bags on a motor cycle.

7. The arrangement of claim 5, wherein said first portion and said second portion of the longitudinal leg of each bracket are interconnected by a cross-bar, so that said first and second portions are spaced from each other a predetermined distance.

8. The arrangement of claim 7, wherein said first portion has an upper side and an underside and said second portion has an upper side and an underside, the under side of said second portion extending in a plane of the upper side of said first portion, said projections extending outwardly from said underside of said second portion whereby in assembly the upper side of the second portion of one bracket lies in the same plane as the upper side of the second portion of another bracket.

9. The arrangement of claim 8, wherein the distance between the neighboring openings is about 1 cm and the distance between the neighboring projections is about 1 cm.

10. The arrangement of claim 8, wherein said brackets are made out of NIROSTA-material (trademark) as stainless steel.

11. The arrangement of claim 10, wherein the distance between the transverse legs is adjustable.

* * * * *